2,830,081

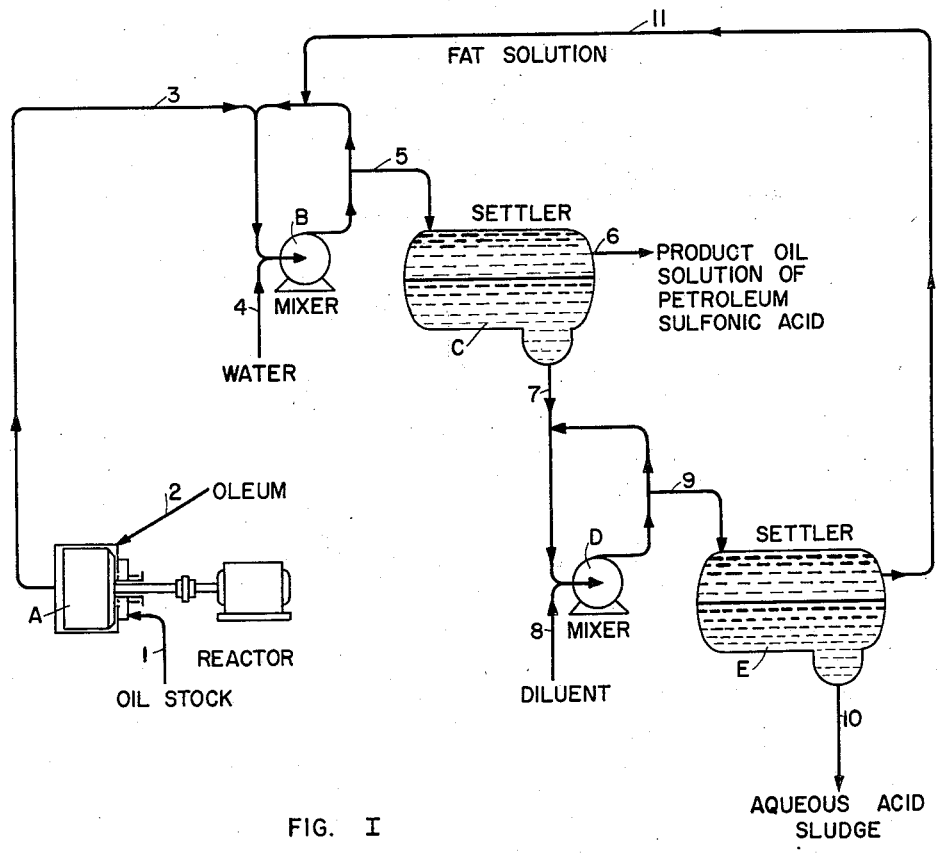
FIG. I
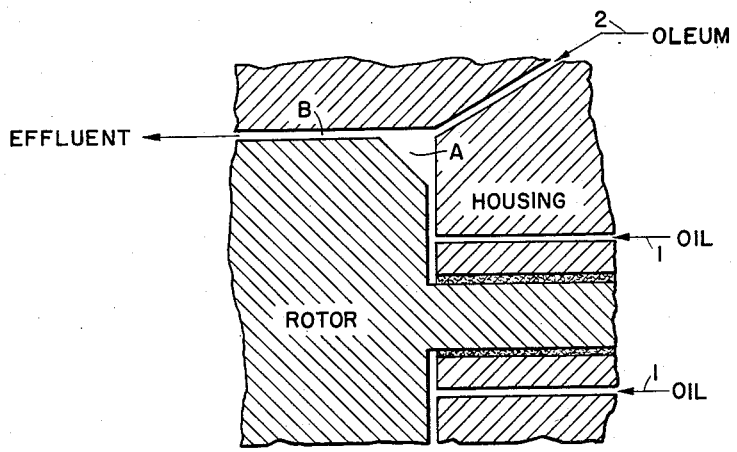
FIG. II
INVENTOR:
ROBERT W. VAN SCOY
BY: Alan C. Batchelder
HIS AGENT

United States Patent Office 2,830,081
Patented Apr. 8, 1958

PROCESS FOR PRODUCING ORGANIC SULFONIC ACIDS

Robert W. Van Scoy, Concord, Calif., assignor to Shell Development Company, New York, N. Y., a corporation of Delaware Application January 22, 1957, Serial No. 635,406

10 Claims. (Cl. 260—504)

This invention relates to the preparation of organic sulfonic acids. More particularly, this invention relates to a new, highly efficient process for the preparation of oil-soluble petroleum sulfonic acids.

It is well known that hydrocarbon oils, such as medium viscosity oil fractions obtained from petroleum, contain materials which will react with sulfuric acid or sulfur trioxide (either as sulfur trioxide per se, or in the form of fuming sulfuric acid) to form various reaction products. One of the most valuable classes of these reaction products comprises the oil-soluble sulfonic acids commonly known as mahogany acids, as oil-soluble petroleum sulfonic acids, or simply as petroleum sulfonic acids.

It has been found, however, that conversion of the sulfonatable materials in the oils to petroleum sulfonic acids is invariably accompanied by the formation of complex tarry materials which are obtained in the form of sludges. These sludges generally contain a substantial amount of the acid sulfonating agent, are physically very difficult to handle, and have no known value. Disposal of such sludges presents a serious problem and they represent a loss of valuable raw material. It has been found that the sulfonatable portions of petroleum oils are selectively sulfonated to form petroleum sulfonic acids rather than tarry materials only with great difficulty. Very careful control of such process variables as the proportions of oil and sulfonating agent charged, reaction temperature, etc. is required. Normally pretreatment of the oil stock to remove the more reactive parts of the sulfonatable material also is required. However, even with such precautions the extent of conversion of the sulfonatable material to petroleum sulfonic acids has been quite low, with a large amount of tarry materials being formed.

I have now discovered a method for conducting the sulfonation of hydrocarbon oils containing sulfonatable materials with concentrated sulfuric acid which results in a much higher conversion of the sulfonatable materials to valuable petroleum sulfonic acids, together with a substantial reduction in the amount of useless tarry materials formed, than has heretofore been obtainable. Briefly, my new process comprises the following steps, performed in the following sequence:

(1) A hydrocarbon oil containing sulfonatable materials and concentrated sulfuric acid are each brought separately but simultaneously to a reaction zone wherein the conditions are such that the acid is dispersed in the form of very fine droplets in the oil, the dispersion being effected in as short a time as is possible, and the dispersion is simultaneously to immediately thereafter subjected to high hydraulic shearing forces;

(2) The dispersion is withdrawn from the reaction zone and mixed with a minor controlled amount of water (preferably, this mixture is thereafter mixed with a substantial amount of a low-viscosity, normally liquid aliphatic hydrocarbon material);

(3) The mixture is allowed to settle, whereupon it stratifies into an aqueous phase containing spent acid and any sludge formed, and a water-immiscible oil phase which contains the oil-soluble petroleum sulfonic acids; and (4) The two liquid phases are separated. The petroleum sulfonic acids may be recovered from the oil phase by methods known to the art, or the oil solution of the sulfonic acids may be used directly for the preparation of other valuable materials, such as the alkali metal and/or alkaline earth metal salts of the sulfonic acids. Methods for accomplishing the formation of such salts of sulfonic acids also are known in the art.

By conducting the sulfonation in this way, 75–80% or more of the sulfonatable material in the oil is converted to petroleum sulfonic acids, and a maximum of but about 10% is converted to tarry materials. As will be shown in more detail hereinafter, these conversions are substantially better than those obtainable with a typical prior art process, which effected at best but about a 55% conversion to petroleum sulfonic acids, and a conversion of about 35–40% of the sulfonatable material to tarry materials. Further, in the new process, the extent of the selective sulfonation of the sulfonatable portion of the oil stock is not significantly dependent upon the reaction zone temperature, and the new process is equally effective whether raw oil stocks or pretreated oil stocks are used.

Further advantages of the process of this invention over the art will be evident from the following detailed description of the process:

Various petroleum hydrocarbon oils and fractions thereof are known in the art to contain sulfonatable materials. All of these oils can be utilized for the preparation of petroleum sulfonic acids according to the process of this invention. In general, however, it is preferred to use hydrocarbon oil fractions derived from naphthenic Gulf Coastal, Mid-Continent or California oils, and particularly the lubricating oil fractions obtained from such crudes.

A naphthenic oil which is particularly useful for the production of petroleum sulfonic acids is a furfural or an Edeleanu raffinate of a naphthenic oil distillate, the raffinate having the following properties:

| | |
|---|---|
| Viscosity (SSU at 100° F.) | 400 to 900 |
| Viscosity index (V. I.) | 30 to 60 |
| Gravity (° API) | 22 to 27 |
| Refractive index ($n\ 20/d$) | 1.48 to 1.51 |
| Flash point (C. O. C., ° F.) | 380 to 450 |

Typical of such oil stocks which have been used are 30 V. I., 33 V. I. and 55 V. I. raffinates from solvent extracted distillates having a viscosity of 60 SSU at 210° F. derived from an 80/20 Poso/Coalinga, California crude mixture. The solvents may be sulfur dioxide, furfural, phenol or the like.

If desired to reduce the viscosity or alter other physical characteristics of the oil stock, an inert diluent may be added in an amount sufficient to provide the necessary change or changes in the oil stock. Suitable as the diluent is any low-viscosity substantially paraffinic and/or naphthenic normally liquid material. Typical of this class of diluent is a paraffinic/naphthenic liquid material having a boiling range of from about 190° F. to about 220° F.—i. e., a light hydrocarbon naphtha. Also suitable are low-viscosity hydrocarbon oils which may or may not contain sulfonatable materials.

If desired, the oil used may be, or may have been, pretreated with about 5–10% of its weight of 95–98% by weight sulfuric acid to remove a part of undesirable highly reactive materials present therein. As will be pointed out in more detail hereinafter, this pretreatment of the oil stock is not necessary to permit use of the oil in the process of the invention, and this fact constitutes one of the features of the new process which provides an advance in the art of preparing petroleum sulfonic acids from oil stocks.

Concentrated sulfuric acid is used as the sulfonating agent in the new process. Thus, any aqueous solution containing more than about 95% by weight of sulfuric acid may be used. Most suitable are those solutions which, because of the sulfur trioxide dissolved therein, contain at least 100% sulfuric acid. The most convenient reagent of this class is the commercial fuming sulfuric acid known as oleum and containing about 105–106% by weight of sulfuric acid.

The effective sulfonating agent in concentrated sulfuric acid is the sulfur trioxide contained therein. The amount of concentrated sulfuric acid charged should be such as to provide from about 4% to about 15% of sulfur trioxide, based on the weight of the oil charged. Preferably, there should be from about 5% to about 10% of sulfur trioxide present, based on the weight of oil stock charged. Thus, when the source of sulfur trioxide is fuming sulfuric acid (oleum, containing approximately 105.5% $H_2SO_4$, equivalent to about 24% $SO_3$ and 76% $H_2SO_4$), the charge of acid normally amounts to from about 10% to about 50% and preferably from about 20% to about 35% of weight of oil charged. Where the oil is subjected to a pretreatment with sulfuric acid, the amount of acid charged in the sulfonation step may be reduced by the amount of sulfur trioxide in the acid consumed in the pretreatment.

The sulfonation can be carried out at any temperature which is convenient, with due regard to handling of the viscous oil. The extent of the sulfonation reaction is substantially independent of the temperature. The rate of the sulfonation reaction is, however, dependent to some extent upon the temperature, especially at lower temperatures. Consequently, it is desirable that the sulfonation be carried out at a temperature above about 40° C., and preferably above about 50° C. No upper limit upon the reaction temperature is known, other than that established by the fact that the temperature should not be so high that the water in the reaction system is flashed to steam at the pressure used. It will be found that temperatures in excess of about 110° C. will be of little advantage over lower temperatures.

The reaction may be conducted under any convenient pressure. Operation at substantially atmospheric pressure often is most convenient, since operation at this pressure simplifies the design of the process equipment. Use of moderately elevated pressures—for example, pressures up to about 10 atmospheres—may be desirable in some cases to permit operation at higher temperatures without causing flashing of the water in the reaction mixture.

Three factors have been found to be critical in effecting the conversion of the sulfonatable portion of a hydrocarbon oil to petroleum sulfonic acids, rather than tarry materials:

A. The acid must be dispersed in the oil in as short a time as possible after the oil and the acid have been brought together. Instantaneous dispersion is desirable; although this is impossible, practically, the time required for effecting the dispersions should approach zero as closely as can be attained. The time required to effect the dispersion must not exceed about 1 second, and desirably is less than about ½ second. Maximum conversion of the sulfonatable material to petroleum sulfonic acids and minimum conversion to tarry materials is normally obtained when the dispersion of the acid in the oil is effected in less than about 250 milliseconds. The rate at which the reactants are fed to the mixing zone and the design of the mixing zone must be such that the time for dispersal of the acid in the oil does not exceed these limits in any local part of the mixing zone.

B. The size of the droplets of the acid in the dispersion must be very small—i. e., the diameter of the droplets must be of the order of 5 microns or less. Desirably, the diameter of the droplets is of the order of 1 micron, or even less.

C. During the formation of the dispersion, or immediately after the formation of the dispersion, and for a sufficient time to provide the necessary reaction time, the reaction mixture must be subjected to high hydraulic shearing forces, of the order of at least about 10,000 reciprocal seconds. Preferably, the shearing forces are at least about 15,000 reciprocal seconds.

When a sulfonatable oil is mixed with concentrated sulfuric acid in this manner, the sulfonatable material reacts with the acid at an extremely high rate to form the petroleum sulfonic acids and little tarry materials. The sulfuric acid concentration in the droplets of acid concurrently falls to about 93% by weight, and is no longer reactive with the sulfonatable materials. This reaction is complete in a matter of a few milliseconds, the half-life of the reaction being about 1 or 2 milliseconds. To insure complete reaction, the residence time of the reaction mixture in the reaction zone should be at least about 10 milliseconds. The residence time may be much longer—up to 10 seconds or more—without adverse effect upon the desired reaction and without significant increase in the amount of tarry materials formed. Residence times in excess of about 1 second will be found of little additional advantage.

Dispersion of the acid in the oil so as to comply with A, B and C above, is most conveniently and effectively accomplished by introducing the oil and the acid separately but simultaneously into a liquid-full mixing zone in which the liquid is maintained in a highly turbulent state. The level of turbulence in the liquid must be such that the Reynolds number of the liquid in the mixing zone is at least 3,000, based upon the average density and the average viscosity of the liquid. Preferably, the Reynolds number of the liquid is at least 4,000. Preferably, the liquid in the mixing zone also is subjected to a high level of hydraulic shearing forces, as has been set out hereinbefore. Alternatively, however, the mixing zone may be immediately followed by a reaction zone, so that the acid is dispersed in the oil in the mixing zone and the dispersion immediately passed to the reaction zone wherein the dispersion is subjected to the necessary high shearing forces. Where this latter procedure is used, the acid-in-oil dispersion must be passed from the mixing zone to the reaction zone without delay.

The manner in which the oil and acid are charged to the mixing zone, including the point or points of entry of each of the reactants into the mixing zone and the relative rates at which each reactant is fed, must be such as to minimize, preferably to prevent, the build-up of any local high concentration of acid relative to the oil, and to assure that the acid is dispersed in the oil in accordance with the requirements of A, B and C as set out hereinbefore.

The reaction mixture withdrawn from the reaction zone is then thoroughly mixed with a minor, controlled amount of water. The amount of water used should amount to from about 4% to about 7% of the weight of concentrated sulfuric acid charged and preferably the amount of water used amounts to from about 5% to about 6% of the weight of the acid originally charged. Thus, the amount of water used should be at least about 0.5% of the weight of the oil charged, but need not exceed about 5% of the weight of the oil, the preferred amount of water being from about 1% to about 2% of the weight of oil originally charged. Preferably, the reaction mixture and water are mixed as soon as the reaction mixture comes from the reactor.

If allowed to stand without any mixing or agitation, the water-diluted reaction mixture will stratify to form two immiscible liquid phases: an aqueous acid phase containing any tarry materials formed in the sulfonation and an oil phase containing the petroleum sulfonic acids. The petroleum sulfonic acids can be recovered from the oil phase by known methods, or, alternatively, the acids can be converted into valuable metal salts in situ in the oil. Methods for effecting this conversion are also known in the art.

Separation of the oil solution of the petroleum sulfonic acids from the aqueous acid sludge is markedly improved if the water-diluted reaction mixture is first mixed with a substantial amount of a low-viscosity, normally liquid hydrocarbon which is miscible with the oil solution, but which is substantially immiscible with water. The diluent should be chemically inert with respect to sulfuric acid. Suitable diluents thus include the aliphatic and naphthenic low-viscosity normally liquid hydrocarbons but do not include the aromatic normally liquid hydrocarbons. Suitable diluents include, for example, substantially non-aromatic petroleum fractions, such as gasoline fractions, petroleum naphthas, kerosene fractions, light oil fractions, low-viscosity lubricating oil fractions, and the like.

The amount of diluent which will give optimum separation of the aqueous acid sludge and the oil solution of petroleum sulfonic acids must be determined by experiment in any given case. However, in general, the amount of diluent should be at least about 50% of the volume of the original oil stock charged, but should not exceed about 500% of the volume of the oil stock charged. If less than about 50% of diluent is added, separation of acid sludge from the oil is too slow; if more than about 500% of diluent is used, the sludge phase normally becomes unmanageable. In the great majority of cases, addition of from about 80% to about 350% of diluent, based on the volume of the original oil stock charged, gives optimum separation of acid sludge from the oil and manageable sludges.

The dilution-separation step may be carried out at any convenient temperature. Preferably, the temperature used is sufficiently high to make the acid sludge and the oil phases readily fluid, but is not so high as to cause evaporation of the diluent, flashing of the water, or other undesirable physical changes in any component of the reaction mixture. Temperatures of from about 30° C. to about 90° C. are normally suitable, temperatures of from about 40° C. to about 70° C. being preferred.

The process of the invention is best illustrated by means of the following actual practical embodiments thereof. It is to be understood that these particular embodiments are intended to illustrate the invention and are not intended to limit the invention in any way not specifically set out in the appended claims.

*Example I*

This embodiment of the invention is illustrated by Figure I. Figure II gives details of the construction of the mixer-reactor used in the embodiment of Figure I.

A lubricating oil fraction was sulfonated according to the process of the invention. This oil stock was a 30 V. I. industrial raffinate representing about 67% of a 60 S. S. U. at 210° F. viscosity mixture of Poso and Coalinga crudes; the raffinate was obtained by furfural extraction of the bulk distillate. The oil stock contained about 35% by weight of aromatic materials, of which about 80% (or about 28% of the oil) is considered to be sulfonatable. This oil stock was continuously charged through line 1 to the reactor (A).

Oleum (105.5% $H_2SO_4$; 24% $SO_3$, 76% $H_2SO_4$) was continuously charged through line 2 to reactor (A). The amount of oleum charged amounted to 33% of the weight of the oil charged.

The temperature of the oil stock was about 50–55° C.; the oleum was at room temperature. The temperature of the mixture in the reactor was about 80–90° C. Substantially atmospheric pressure was used.

As is shown in Figure II, a mixer-reactor was used, the residence time in the mixing section being 0.15 second, the Reynolds number of the liquid in the mixing zone (A) being 4,000 and the liquid in the mixing zone being subjected to a hydraulic shear of 30,000 reciprocal seconds. The residence time in the high-shear zone (B) was 0.04 second and the shearing forces were 180,000 reciprocal seconds.

The mixer-reactor used consisted of a metal rotor mounted on a shaft and enclosed by a metal housing. The rotor was in the form of a right cylinder, except that a small triangular annular section had been removed from a peripheral edge of the rotor, as shown in Fig. II. The housing also was in the form of a right cylinder closely fitted to the rotor. The rotor was rotated by a motor. When fitted together, the rotor and housing were separated by but a very small space at all points except at the point where the triangular annular section had been removed from the rotor. The housing was provided with means for introducing the oleum and the oil to be sulfonated separately but simultaneously into the triangular annular space between the rotor and the housing. The triangular annular space connected to the small space between the peripheral surface of the rotor and the housing which in turn connected to the small space between the end of the rotor opposite the triangular annular space and the housing, which in turn connected with an exit in the housing. See Figs. I and II for details. The triangular annular space acted as the liquid-full mixing zone (wherein the liquid also was subjected to high shearing forces); the space between the peripheral and end surfaces of the rotor and the housing acted as the reaction zone wherein the liquid was subjected to additional high shearing forces. The turbulence and shearing forces in the mixing zone were controlled by the size of the triangular annular space and the speed of rotation of the rotor. The shearing forces in the reaction zone were controlled by the speed of rotation of the rotor and by the distance maintained between the peripheral and end surfaces of the rotor and the housing. Correlation between the turbulence and shearing forces in the mixing zone and the shearing forces in the reaction zone was obtained by controlling the relationship between the size of the triangular annular mixing zone and the distance between the peripheral and end surfaces of the rotor and the housing. The necessary reaction time was obtained by control of the rate at which the oleum and oil were fed, by the volume of the mixing zone and by the volume of the reaction zone.

The reaction mixture, or sulfonation mix, was continuously withdrawn from the reactor (A) and sent through line 3 to the first stage of a two-stage dilution-separation system. Line 3 carried the sulfonation mix continuously to a mixing loop wherein the sulfonation mix was first diluted with water (continuously added through line 4) amounting to 1.8% of the weight of oil charged, and then with a light hydrocarbon diluent coming via line 11 from the second stage of the dilution-separation system. The diluted sulfonation mix was then continuously withdrawn from the first mixing loop and sent via line 5 to the first settler (C). The product oil solution of petroleum solfonic acids was continuously withdrawn from the upper section of settler (C) via line 6. The lower liquid phase in settler (C), consisting of an aqueous acid sludge, was continuously withdrawn from the settler and passed via line 7 to the second mixing loop of the dilution-separation system. Here, the acid sludge was mixed with fresh diluent, a gasoline fraction having a boiling range of 200–230° F. and an aromatic content below about 0.5% by weight, the amount of diluent, continuously added through line 8, being three times the volume of the oil charged. The diluted sludge was withdrawn from the mixing loop via line 9 and sent to the second settler (E). The aqueous acid sludge, the lower liquid phase, was withdrawn from settler (E) via line 10 and sent to sludge recovery. The upper phase, a diluted oil solution of the petroleum sulfonic acids, was continuously returned via line 11 to the first mixing loop. The dilution-separation system was maintained at a temperature of about 120° F.

The yield of oil-soluble petroleum sulfonic acids amounted to about 22% of the weight of the oil charged, which represents a conversion of about 80% of the sulfonatable material in the oil to useful petroleum sulfonic acids. The amount of tarry materials formed amounted to about 3% of the weight of the original oil charged.

*Example II*

In this embodiment of the process of the invention, the physical equipment used in Example I was used. The oil stock charged was that of Example I, but which had been pretreated with 5% by weight of 98% by weight sulfuric acid. The charge of oleum was reduced by a like amount—to 28.5% of the weight of the oil charged. The sulfonation mix was diluted with 1.4% by weight of water, based on the weight of oil charged. All of the other conditions were as in Example I. 81.5% of the sulfonatable material was converted to the petroleum sulfonic acids. The amount of sludge formed was approximately 3% of the weight of oil charged. It is thus evident that pretreatment of the oil is unnecessary.

*Example III*

The experiments of Examples I and II were repeated, using two other different mixer-reactors, which subjected the reaction mixture to the following conditions:

| Reactor | Mixing Section | | | Shearing Section | |
|---|---|---|---|---|---|
| | Residence time (seconds) | Reynolds Number | Shear (sec.$^{-1}$) | Residence time (seconds) | Shear (sec.$^{-1}$) |
| A | 0.05 | 9,000 | 6,500 | 0.01 | 45,000 |
| B | 0.05 | 9,600 | 14,400 | 0.001 | 180,000 |

Each of these reactors resulted in substantially the same conversion of the sulfonatable material to petroleum sulfonic acids, with the same amount of tar formation, as were obtained with the reactor of Figure I.

*Example IV*

Various other reactors and mixers were investigated, the experimental method and equipment of Example I otherwise being followed. From the results of these investigations, the criticality of the speed of dispersion of the acid in the oil, of the size of the droplets of the acid in such dispersions and the subjection of the dispersion to high hydraulic shearing forces, set out hereinbefore as regards the selective conversion of the sulfonatable materials of the oil stock used to useful petroleum sulfonic acids, rather than to useless tars, was determined.

*Example V*

Using the reactor of Figure II and the physical system set out in Example I, the effect of variation of certain of the process conditions on the extent and the direction of the conversion of the sulfonatable material of the oil stock was determined. The permissible and preferred limits on the various process conditions set out hereinbefore were all determined in this way.

Of particular interest are my discoveries that in the new process, the reaction temperature is not a significant factor as regards the extent and direction of the reaction between the sulfonatable material in the oil and the acid. At the usual temperatures of from about 50° C. to about 110° C., the extent of the conversion of the sulfonatable material to petroleum sulfonic acids and the selectivity of the reaction is independent of the reactor temperature.

Also of particular interest is the fact that where the acid was not immediately dispersed in the oil and the dispersion subjected to high shearing forces, the yields of petroleum sulfonic acids were much lower, and the yields of tars much higher, and that addition of small amounts of water substantially reduced the equivalent weight of the product petroleum sulfonic acids. It was also found that where the dispersion of the acid in the oil was immediate, and the dispersion subjected to high shearing forces, the improved results obtainable thereby were not realized unless the effluent was diluted with a minor, controlled, amount of water. The equivalent weight of the product is not reduced by the addition of water, in this case.

That high shear alone is not effective for the selective production of petroleum sulfonic acids by the reaction of a hydrocarbon oil with concentrated sulfuric acid was shown by employing a commercially available colloid mill as reactor. The fluid passing through this type of mill is not subjected to any high degree of turbulence, albeit the fluid is subjected to very high shearing forces. Conversion of the sulfonatable portion of the oil to petroleum sulfonic acids was substantially lower than that resulting from performance of the process of the invention, the highest conversion possible using the colloid mill being about 60% of the sulfonatable material. About 7–8% of sludge, based on the weight of the oil, was formed. Further, the product obtained through the use of the colloid mill was of varying quality. Close control of reactor temperature was found essential to the use of the colloid mill, and the oil had to be pretreated with sulfuric acid to obtain even these results.

The advantages of the process which I have discovered over the processes taught and disclosed in the art are clearly demonstrated by comparison of a process typical of the art which has heretofore been used on a large scale for the conversion of the sulfonatable materials in lubricating oil fractions to petroleum sulfonic acids, and the results obtained through practice of that process, with the process of the invention and the results obtained through its practice.

In the process of the art, an industrial raffinate such as that used in Example I is first treated with about 5% by weight of 95–98% by weight sulfuric acid, the oil separated from the sludge, and treated with oleum in a recycle mixer-mixing loop, the product diluted with a light aliphatic liquid hydrocarbon and allowed to stratify, the oil layer containing the product petroleum sulfonic acids. The yield of petroleum sulfonic acids was at most about 55% of the sulfonatable material present; the yield of sludge was about 10% of the weight of oil charged. The reaction system was extremely sensitive to temperature, close control of the reactor temperature to from about 90° F. (30° C.) to about 105° F. (40° C.) being required.

By performing the sulfonation according to this invention, no pretreatment is ordinarily required, and may be omitted if desired, the reaction system is substantially independent of the reaction temperature, the yield of petroleum sulfonic acids is substantially higher, and the make of tarry sludges is reduced markedly. The invention thus provides an operationally simple, highly effective process for preparing oil-soluble petroleum sulfonic acids.

I claim as my invention:

1. A process for preparing oil-soluble petroleum sulfonic acids comprising charging separately but simultaneously a hydrocarbon oil and concentrated sulfuric acid to a mixing zone wherein the acid is immediately dispersed in the form of very small droplets in the oil, simultaneously to immediately thereafter subjecting the resulting dispersion to high hydraulic shearing forces, withdrawing the dispersion from said mixing zone, and mixing said dispersion with from about 0.5% to about 5.0%, based on the weight of oil charged, of water.

2. A process for preparing oil-soluble petroleum sulfonic acids comprising charging separately but simultaneously a hydrocarbon oil and concentrated sulfuric acid to a mixing zone wherein the acid is immediately dispersed in the form of very small droplets not exceeding about 5 microns diameter in the oil, simultaneously to immediately thereafter subjecting the resulting dispersion to high hydraulic shearing forces, withdrawing the dispersion from said mixing zone, and mixing said dispersion with from about 0.5% to about 5.0%, based on the weight of oil charged, of water.

3. A process for preparing oil-soluble petroleum sulfonic acids comprising charging separately but simultaneously a hydrocarbon oil and concentrated sulfuric acid to a mixing zone wherein the acid is immediately dispersed in the form of very small droplets in the oil, simultaneously to immediately thereafter subjecting the resulting dispersion to high hydraulic shearing forces of the order of at least 10,000 reciprocal seconds, withdrawing the dispersion from said mixing zone, and mixing said dispersion with from about 0.5% to about 5.0%, based on the weight of oil charged, of water.

4. A process for preparing oil-soluble petroleum sulfonic acids comprising charging separately but simultaneously a hydrocarbon oil and concentrated sulfuric acid to a mixing zone wherein the acid is immediately dispersed in the form of very small droplets not exceeding about 5 microns diameter in the oil, simultaneously to immediately thereafter subjecting the resulting dispersion to high hydraulic shearing forces of the order of at least 10,000 reciprocal seconds, withdrawing the dispersion from said mixing zone, and mixing said dispersion with from about 0.5% to about 5.0%, based on the weight of oil charged, of water.

5. A process for preparing oil-soluble petroleum sulfonic acids comprising charging separately but simultaneously a hydrocarbon oil and concentrated sulfuric acid to a mixing zone wherein the acid is immediately dispersed in the form of very small droplets not exceeding about 5 microns diameter in the oil, simultaneously to immediately thereafter subjecting the resulting dispersion to high hydraulic shearing forces of the order of at least 10,000 reciprocal seconds, withdrawing the dispersion from said mixing zone, and mixing said dispersion with from about 0.5% to about 5.0%, based on the weight of oil charged, of water mixing the resulting mixture with from about 50% to about 500%, based on the volume of oil charged, of a low-viscosity normally liquid aromatic-free hydrocarbon diluent, passing the resulting mixture to a settling zone wherein the mixture is allowed to stratify into two immiscible liquid phases, an aqueous acid phase and an oil phase containing oil-soluble petroleum sulfonic acids, and recovering the said oil phase.

6. A process for preparing oil-soluble petroleum sulfonic acids comprising charging separately but simultaneously a hydrocarbon oil and concentrated sulfuric acid to a liquid-full zone wherein the liquid is maintained in a highly turbulent state, simultaneously to immediately thereafter subjecting the liquid to high hydraulic shearing forces and mixing the resulting liquid mixture with from about 0.5% to about 5.0%, based on the weight of oil charged, of water.

7. A process for preparing oil-soluble petroleum sulfonic acids comprising charging separately but simultaneously a hydrocarbon oil and concentrated sulfuric acid to a liquid-full zone wherein the liquid is maintained in a highly turbulent state, having a Reynolds number of at least 3,000, simultaneously to immediately thereafter subjecting the liquid to high hydraulic shearing forces and mixing the resulting liquid mixture with from about 0.5% to about 5.0%, based on the weight of oil charged, of water.

8. A process for preparing oil-soluble petroleum sulfonic acids comprising charging separately but simultaneously a hydrocarbon oil and concentrated sulfuric acid to a liquid-full zone wherein the liquid is maintained in a highly turbulent state, simultaneously to immediately thereafter subjecting the liquid to high hydraulic shearing forces of the order of at least 10,000 reciprocal seconds and mixing the resulting liquid mixture with from about 0.5% to about 5.0%, based on the weight of oil charged, of water.

9. A process for preparing oil-soluble petroleum sulfonic acids comprising charging separately but simultaneously a hydrocarbon oil and concentrated sulfuric acid to a liquid-full zone wherein the liquid is maintained in a highly turbulent state, having a Reynolds number of at least 3,000 simultaneously to immediately thereafter subjecting the liquid to high hydraulic shearing forces of the order of at least 10,000 reciprocal seconds and mixing the resulting liquid mixture with from about 0.5% to about 5.0%, based on the weight of oil charged, of water.

10. A process for preparing oil-soluble petroleum sulfonic acids comprising charging separately but simultaneously a hydrocarbon oil and concentrated sulfuric acid to a liquid-full zone wherein the liquid is maintained in a highly turbulent state, having a Reynolds number of at least 3,000, simultaneously to immediately thereafter subjecting the liquid to high hydraulic shearing forces of the order of at least 10,000 reciprocal seconds and mixing the resulting liquid mixture with from about 0.5% to about 5.0%, based on the weight of oil charged, of water mixing the resulting mixture with from about 50% to about 500%, based on the volume of oil charged, of a low-viscosity normally liquid aromatic-free hydrocarbon diluent, passing the resulting mixture to a settling zone wherein the mixture is allowed to stratify into two immiscible liquid phases, an aqueous acid phase and an oil phase containing oil-soluble petroleum sulfonic acids, and recovering the said oil phase.

No references cited.